United States Patent
Cook et al.

(10) Patent No.: US 9,180,584 B1
(45) Date of Patent: Nov. 10, 2015

(54) DUCT ASSEMBLY TOOL

(71) Applicants: James Cook, Felicity, OH (US); Krystal Beckelhimer, Felicity, OH (US)

(72) Inventors: James Cook, Felicity, OH (US); Krystal Beckelhimer, Felicity, OH (US)

( * ) Notice: Subject to any disclaimer, the term of this patent is extended or adjusted under 35 U.S.C. 154(b) by 247 days.

(21) Appl. No.: 13/869,140

(22) Filed: Apr. 24, 2013

Related U.S. Application Data

(60) Provisional application No. 61/637,705, filed on Apr. 24, 2012.

(51) Int. Cl.
  *B25B 33/00* (2006.01)
  *B25B 27/14* (2006.01)

(52) U.S. Cl.
  CPC .............. *B25B 27/14* (2013.01); *B25B 27/146* (2013.01); *B25B 33/00* (2013.01)

(58) Field of Classification Search
  CPC .... B25B 31/005; B25B 27/02; B25B 27/146; B25B 33/00; B25B 31/00
  USPC .................................... 29/238, 244, 267, 268
  See application file for complete search history.

(56) References Cited

U.S. PATENT DOCUMENTS

| | | | | |
|---|---|---|---|---|
| 1,398,342 | A * | 11/1921 | Pleaue | 30/164.5 |
| 1,484,222 | A * | 2/1924 | Kightlinger | 294/118 |
| 1,809,386 | A * | 6/1931 | Mason | 29/243.56 |
| 3,314,319 | A * | 4/1967 | Schmidt | 81/367 |
| 3,630,549 | A | 12/1971 | Grimm | |
| 3,822,468 | A * | 7/1974 | Mueller | 29/268 |
| 3,991,635 | A * | 11/1976 | Marone | 81/420 |
| 4,265,009 | A | 5/1981 | Mann | |
| 4,315,361 | A * | 2/1982 | Brooks | 29/432.1 |
| 4,386,543 | A * | 6/1983 | Walker, Jr. | 81/420 |
| 4,466,641 | A | 8/1984 | Heilman et al. | |
| 4,713,959 | A * | 12/1987 | Bennett | 72/409.18 |
| 4,763,393 | A | 8/1988 | Gee | |
| 4,974,441 | A * | 12/1990 | Keeney et al. | 72/458 |
| 5,020,202 | A * | 6/1991 | Turrell | 29/243.56 |
| 5,404,616 | A * | 4/1995 | Carmien | 16/422 |
| 5,437,084 | A * | 8/1995 | Woolery | 29/238 |
| 5,660,069 | A | 8/1997 | Williams | |
| 5,661,886 | A * | 9/1997 | Smith | 29/243.56 |
| 5,794,322 | A * | 8/1998 | Issagholian-Havai | 29/243.56 |
| 6,175,998 | B1 * | 1/2001 | Leo | 29/268 |

(Continued)

OTHER PUBLICATIONS

"TDC/TDF Cleat Dimple Installation Tool", http://www.ebay.com/itm/TDC-TDF-Cleat-Dimple-Installation-Tool, Jan. 12, 2012, 1 page.

(Continued)

*Primary Examiner* — Lee D Wilson
*Assistant Examiner* — Tyrone V Hall, Jr.
(74) *Attorney, Agent, or Firm* — Hasse & Nesbitt LLC; Daniel F. Nesbitt

(57) ABSTRACT

A combination tool for installing and crimping a cleat for fastening sections of ductwork, and for adjusting the threaded on support rods of strut channel for leveling the ductwork. The tool has an installing plate for holding a cleat and a removable handle that threads to the back of the installing plate. The handle has a hollow tubular body with a nut driver formed in the other end, for engaging and driving a threaded nut. The nut driver end is made by milling a rectangular slot transverse the axis of the hollow tubular body to form a pair of nut-engaging. A shank can be provided for attachment to the chuck of a power drill for rapid driving of the nuts. The tool also has a hinged crimping plate with threaded set screws for crimping the cleat securely to the flanges of the ductwork.

11 Claims, 9 Drawing Sheets

(56) References Cited

U.S. PATENT DOCUMENTS

| | | | |
|---|---|---|---|
| 6,378,191 B1 * | 4/2002 | County | 29/434 |
| 6,925,697 B2 * | 8/2005 | Kratz | 29/267 |
| 8,024,850 B2 | 9/2011 | Di Lalla | |
| 2006/0218766 A1 * | 10/2006 | Marlow et al. | 29/243.56 |
| 2006/0254057 A1 * | 11/2006 | Houseman et al. | 30/92 |

OTHER PUBLICATIONS

"Cleat Installation Tool", *Ward Industries, Product Catalog*, Edition 4, p. 19 Aug. 2009, 3 pages.

* cited by examiner

DUCT ASSEMBLY TOOL

CROSS-REFERENCE TO RELATED APPLICATIONS

This application claims the benefit of U.S. Provisional application 61/637,705, filed Apr. 24, 2012, the disclosure of which is incorporated by reference in its entirety.

BACKGROUND

A variety of articles of manufacture are fabricated by cutting, bending and otherwise forming sheet metal. Duct work for heating, ventilating and air conditioning purposes is often times fabricated from sheet metal. Typically, sections having a variety of configurations and dimensions are prefabricated in a shop setting where the prefabrication can be done more easily, more efficiently and more cost effectively. The sections of fabricated sheet metal are then transported to the job site where they are to be installed. The prefabricated sections are set in place, typically by hanging or otherwise supporting the sections on strut channels suspended from the ceiling structure using threaded rods. A nut threaded along rod raises or lowers the strut channel elevation for leveling the ductwork. The sections are then joined one to another, forming a completed system.

A number of methods have been utilized for joining fabricated sections of sheet metal, including screwing, welding and fastening by a variety of mechanical means. One method of joining the prefabricated sections involves forming a flange at the ends of the sheet metal fabrications which are to be joined. The flanges are then butted one up against another and secured by a mechanical clip known as a TDC cleat. The TDC cleat is a mechanical connector formed of sheet metal and is secured to the pair of flanges by hooking a lip formed on the cleat under the edge of the first flange and forcing, by a lever action, the cleat over the outside edge of the second flange. The cleat is formed in such a way that it is approximately 6" in length and having a first leg with a lip for grabbing the outside edge of the first flange. Opposite the cleat lip is a longer second leg. The cleat first and second legs are joined together by a bridge section. Once the cleat is placed over the two flanges as described above, the second leg is crimped, securing the cleat in place, joining the flange sections.

The TDC cleat is installed with two separate operations: First, an installation or positioning procedure wherein the cleat is snapped over the outside edges of the adjoining flanges, and second, a crimping operation wherein the second leg of the cleat is crimped to secure the connector into place.

These operations or procedures have been accomplished by the use of two separate tools. First, a placement tool having a cross-sectional configuration corresponding to the cross-sectional configuration of the TDC cleat. The placement tool has a lip which secures the cleat for placement over the outside edge of the first flange. The placement tool further comprises a lever means for levering the cleat over the outside edge of the second flange. Once this operation is complete, the placement tool is removed and a separate crimping tool is used for crimping the leg of the TDC cleat to complete the operation. The crimping tool presently used is configured such that it allows crimping only at one point at a time, and the installer must start at one end of the cleat, crimping along the full length of the cleat.

U.S. Pat. No. 5,661,886, the disclosure of which is incorporated by reference in its entirety, describes a combination clip or cleat installation and crimping tool, that is used to install the clip over the edges of the two flanges, and then to crimp the second leg of the clip. Notwithstanding, there remains a need for improved tools for the installation of ductwork, including the placement and crimping of cleats and the positioning and leveling of the ductwork.

SUMMARY OF INVENTION

An aspect of the present invention is to provide a tool which combines both the installation and crimping functions of the two tools presently conventionally used for installing and crimping TDC cleats, to enable quicker and more efficient installation of the TDC cleats and the sheet ductwork itself.

Another aspect of the present invention is combine multiple functionality into a single tool, to aid in eliminating one tool from the sheet metal worker's already overcrowded tool belt.

Another aspect of the present invention is to allow the crimping process to be completed in a single operation, rather than a series of operations. An aspect of the present invention is to provide a tool that provides installing the TDC cleat onto the seams of ductwork with a high and consistent level of quality for each installation.

The present invention provides a tool for installing and crimping a cleat for fastening together sections of sheet ductwork, the tool comprising: a) an installing plate having a front face and a rear face, including a ledge extending from the bottom of the front face, the distal edge of the ledge including an upturned lip, configured to hold a cleat prior to installation, and including a threaded bore on the rear face; and b) at least two handles, each having a threaded proximal end for selected threaded connection into the threaded bore of the installing plate, the first handle having a length of at least 1.5 times the length of the installing plate, and the second handle having a length of about one-half the length of the first handle.

The present invention also provides a combination tool for installing a cleat for fastening together sections of sheet ductwork, and for adjusting threaded nuts, the combination tool comprising: a) an elongated installing plate having a front face, including a ledge extending from the bottom of the front face, the distal edge of the ledge including an upturned lip, configured to hold a cleat prior to installation; and b) a handle attached to the rear face of the installing plate, having a hollow tubular body, the distal end of the hollow tubular bore comprising a nut driver for engaging and driving a threaded nut.

The present invention also provides a combination tool for installing and crimping a cleat for fastening together sections of sheet ductwork, the combination tool comprising: a) an elongated installing plate having a front face, including a ledge extending from the bottom of the front face, the distal edge of the ledge including an upturned lip, configured to hold a cleat prior to installation; b) a handle attached to and extending from the rear face of the installing plate; c) a crimping plate pivotably attached to the top of the installing plate, the crimping plate having a surface for engaging and crimping a leg of the cleat; and d) a crimping handle attached to and extending rearwardly from the crimping plate.

The present invention also provides a combination tool for installing and crimping a cleat for fastening together sections of sheet ductwork, and for adjusting threaded nuts for raising and lowering strut channel elevation for leveling the ductwork, the combination tool comprising: a) an elongated installing plate having a front face and a rear, including a ledge extending from the bottom of the front face, the distal edge of the ledge including an upturned lip, configured to hold a cleat prior to installation, and a threaded bore disposed in the rear face; b) at least one handle including a hollow tubular body, a threaded proximal end that threads into the threaded bore of the installing plate for separable attachment of the handle to the installing plate, and a shank, disposed inboard of the threaded end, configured engagement by the chuck of a power drill, wherein a distal end of the tubular body has a rectangular bore transverse the axis of the hollow tubular body to define opposed confronting planar, parallel surfaces, for engaging and driving a threaded nut; c) a crimping plate pivotably attached to the top of the installing plate, the crimping plate having a surface for engaging and crimping a leg of the cleat; and d) a crimping handle attached to and extending rearwardly from the crimping plate.

DETAILED DESCRIPTION OF INVENTION

Figure 1:
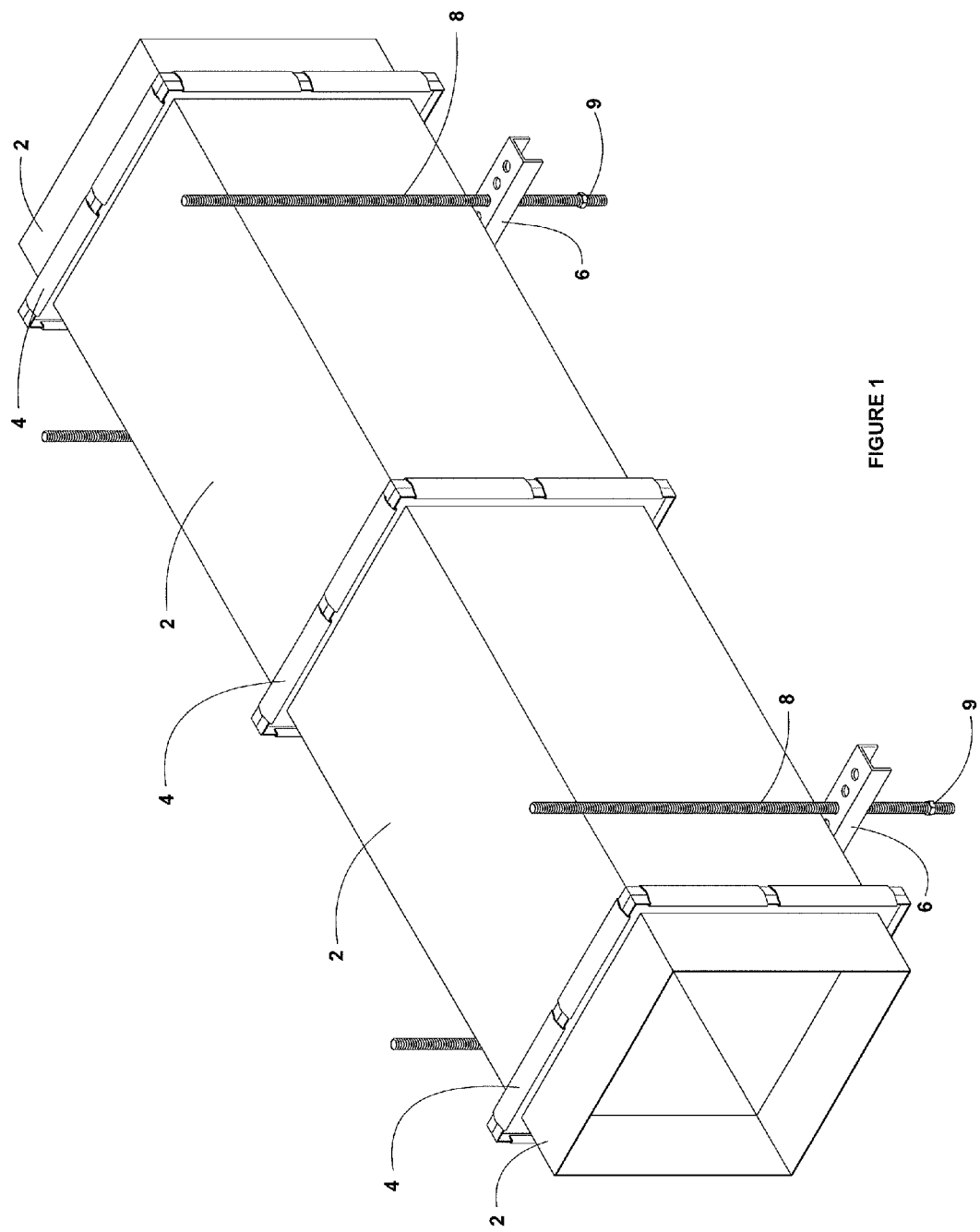
FIG. 1 shows prefabricated sections of sheet metal duct joined together with cleats, and suspended on strut channels using threaded rods and nuts.

FIG. 1 shows prefabricated sections 2 of sheet metal duct joined together with cleats 4, and suspended on strut channels 6 using threaded rods 8 and nuts 9.

Figure 2:
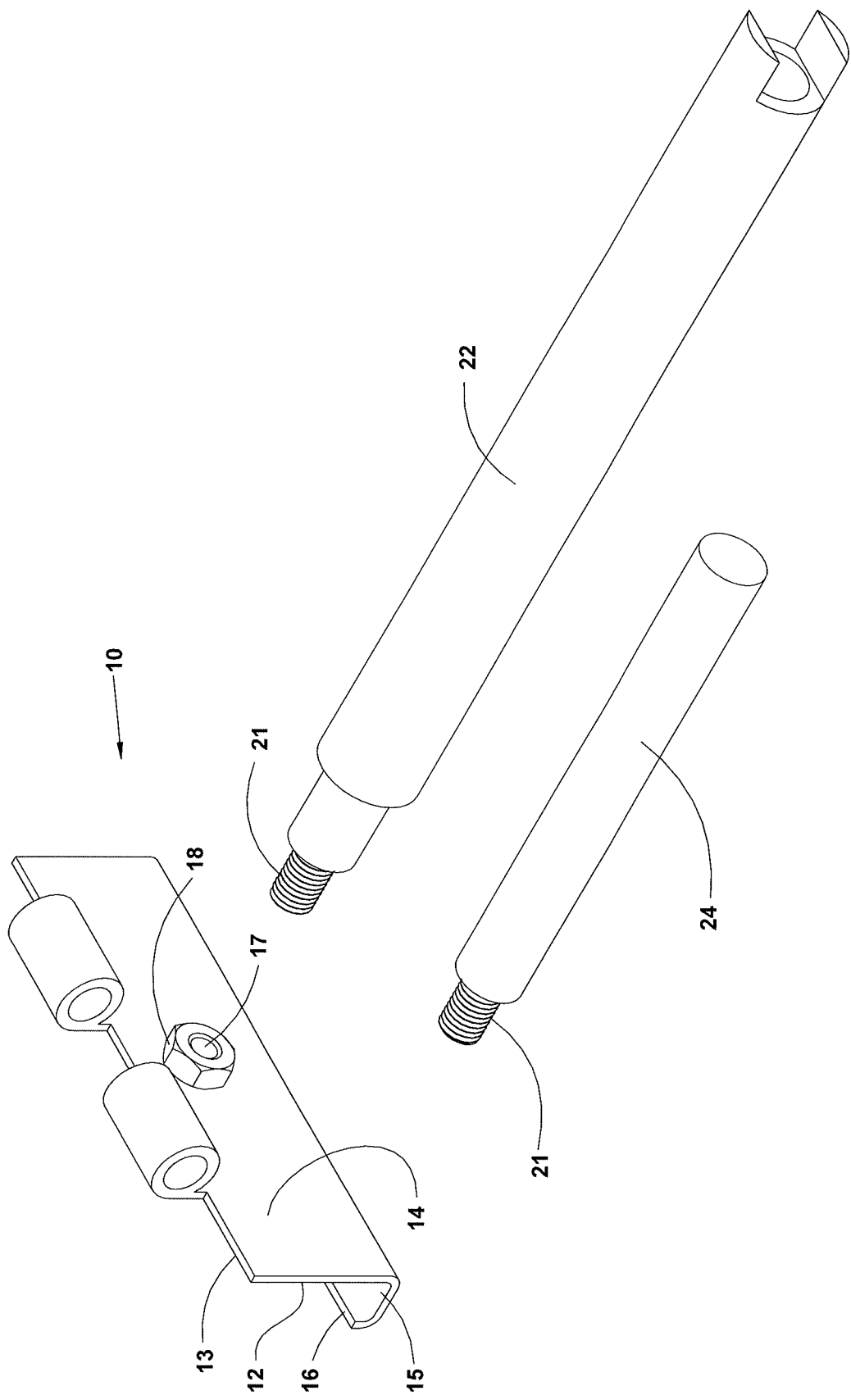
FIG. 2 shows an embodiment of a tool for installing a cleat having two separable handles that each thread onto a cleat installer.
Figure 7:
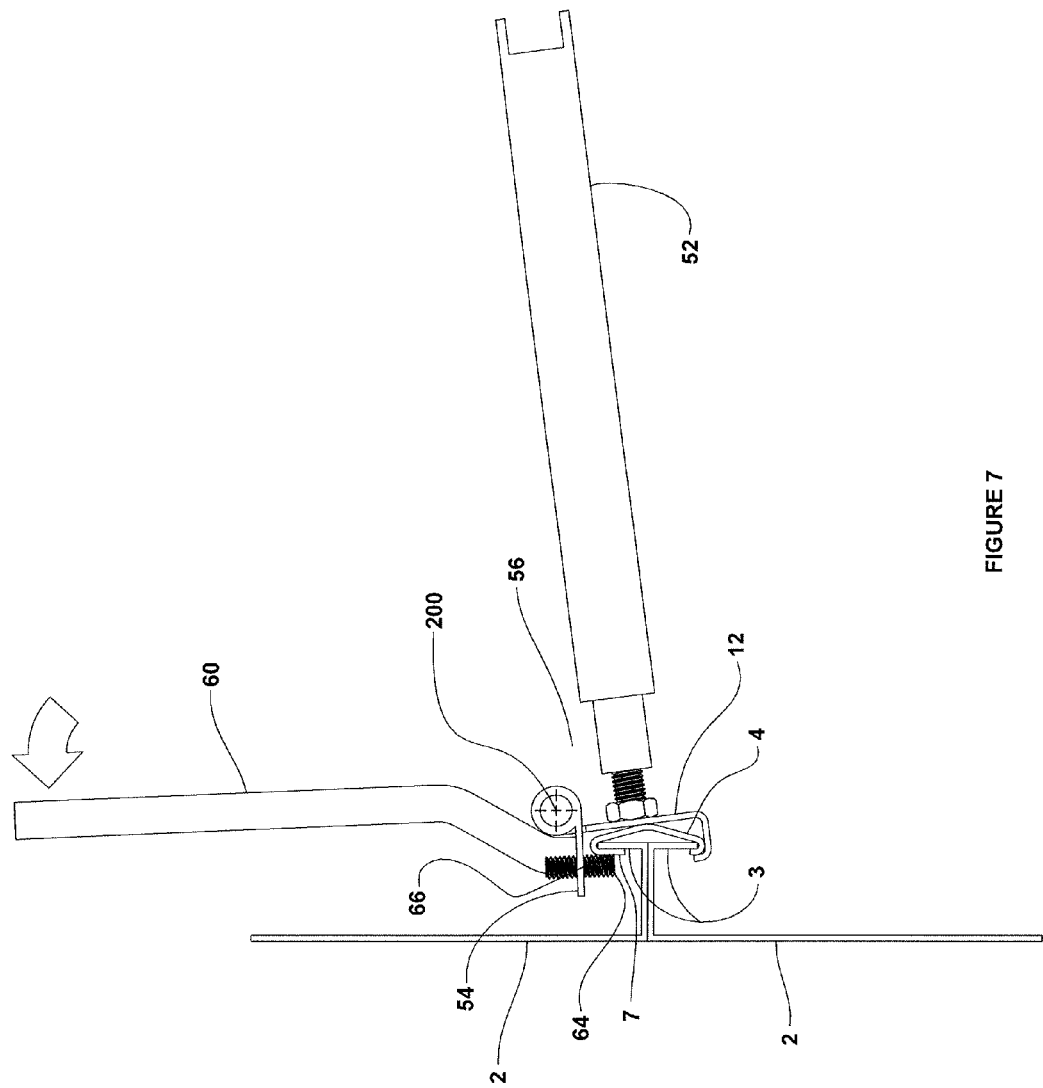
FIG. 7 shows the tool of FIG. 6A in use, crimping the cleat onto the flanges of ductwork sections.

FIG. 2 shows a first embodiment of a tool 10 of the present invention for installing a cleat that includes an installing plate 12 and two separable handles, including a longer, standard-length handle 22 and a short handle 24. The installing plate 12 is shown as an elongated plate having a front face 13 and a rear face 14, with a ledge 15 extending forward from the bottom edge of the front face of the installing plate. The ledge 15 has an upturned lip 16 at its distal end. The ledge 15 and upturned lip 16 extend from at least both sides, and typically along the entire length of, the installing plate. The front face 13, ledge 15 and lip 16 cooperate to hold the length of a cleat 4 for installing the cleat onto the flanges of the duct work, as shown in FIG. 7.

The rear face of the installing plate 12 include a threaded bore 17 on the rear face, shown as the threads of a nut 18 that is secured (for example, by welding) onto the rear face of the installing plate.

The handles 22,24 have a threaded proximal end 21 selective attachment to and removal from the threaded bore 17 of the installing plate 12. The longer, standard-length handle 22 is ordinarily used as its length provides improved leverage to installing the second leg of the cleat over the edges of the flanges, as shown in FIG. 6. The length of the longer handle 22 (from end to end) is typically at least 1.5 times, and more typically about twice, the length of the installing plate. The second handle typically has a length of about half the length of the longer handle. The shorter handle can be quickly replaced for the longer handle when working in cramped or tight spaces, which is routine. For a typical cleat 4 having a length of about 6 inches, the length of installing plate is about four inches, the length of the longer handle is about 8 inches, and the length of the second, shorter handle is about 4 inches.

Figure 3:
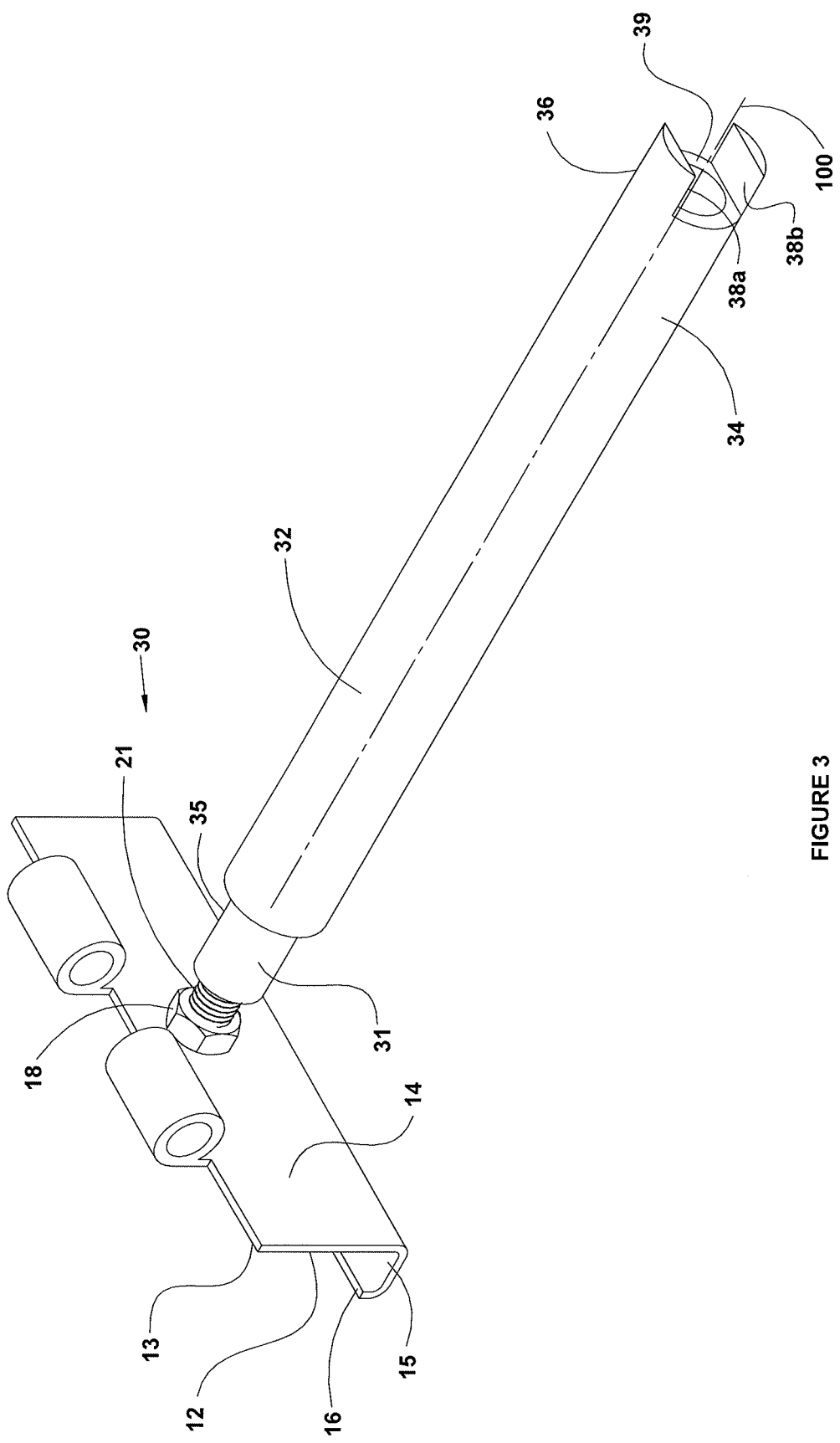
FIG. 3 shows another embodiment of a tool for installing a cleat having a hollow handle body with a nut driver at the end for engaging and driving a threaded nut.

FIG. 3 shows a second embodiment of combination tool 30 for installing a cleat for fastening together sections of sheet ductwork, and for adjusting threaded nuts for raising and lowering strut channel elevation for leveling the ductwork. The combination tool 30 includes elongated installing plate 12 having a front face 13, a ledge 15 extending from the bottom of the front face 13 with an upturned lip 16, as described above, for holding a cleat prior to installation. A tubular handle 32 is attached to the rear face 14 of the installing plate 12 at its proximal end 35. The tubular handle has a hollow tubular body 34, the hollow portion extending from its distal end 36 to at least near the proximal end 35.

Figure 4:
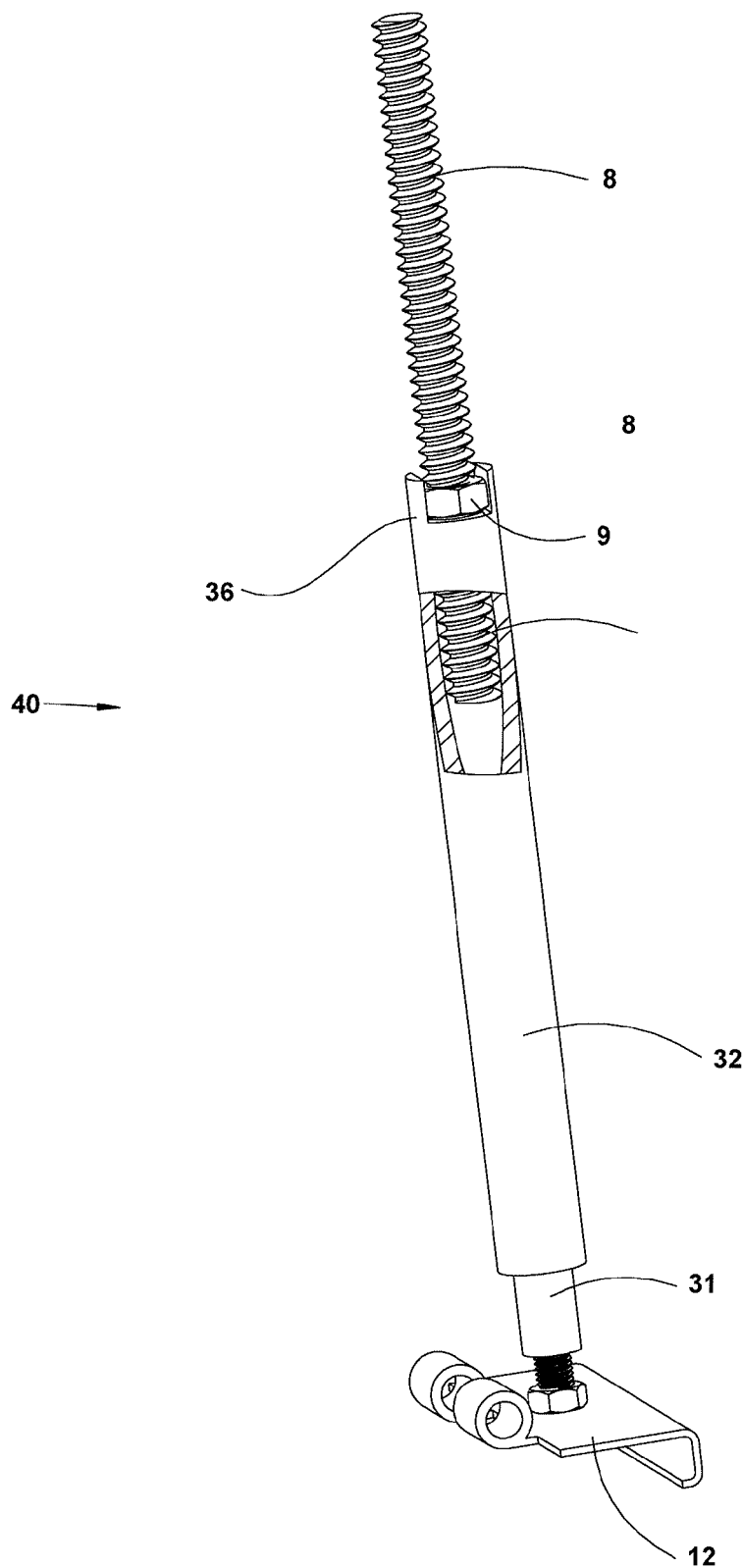
FIG. 4 shows the tool of FIG. 3 for engaging and driving a threaded nut.

The distal end 36 of the tubular body 34 is formed to provide a nut driver 40 for engaging and driving a threaded nut 9 onto a threaded rod 8, as shown in FIG. 4. In the illustrated embodiment, two flats 38a,38b are formed in confronting, parallel relation to one another, and spaced apart to accommodate and engage oppose sides of a threaded, standard-sized nut that is typically used in HVAC ductwork and strut channel construction. The flats 38a,38b can be formed at the end of the tubular sidewall by slot milling a rectangular-shaped section of the sidewall 39 on opposed sides of the end 36, typically through the centerline 100. The thickness of the hollow tubing and the size of the mill can be selected so that a portion of the inner wall of the lateral sidewalls is removed to form the flats 38. A thinner sidewall may result in an unmilled portion of the lateral sidewall remaining in the middle of the flat(s). The long hollow portion of the handle has an interior diameter sufficient to accommodate the threaded rod 8, which allows the end of the threaded rod 8 to pass through as the nut 9 is driven further along the rod 8.

Other embodiments of the nut driver can be made that comprise the at least two flats or protrusions in confronting relation to form a nut driver, and other machining operations and methods can be employed. In an alternative embodiment, opposed flat members can be inserted and fixed in the distal end of the tubular body for engaging a nut. In another alternative embodiment, a nut socket can be fixed at the distal end.

The handle 32 and installing plate 12 can be made unitary, where the handle is permanently attached to the attaching plate 12, such as by welding. The combination tool can be handled manually to drive a nut along the threaded rod.

Alternatively, the tubular handle 32 can be made removable from the attaching plate 12, as described otherwise described in the first embodiment. The handle 32 can include a threaded end 21 that can be threaded into a threaded bore in the rear face of the installing plate 12, such as the securement nut 18.

In an alternative embodiment, a shank portion 31 can be provided inboard (along the axis 100) from the threaded end 21. The shank 31 provides a cylindrical outer surface that can be secured to a chuck of a standard power drill, which reduces the time and effort for leveling the strut channels when leveling the ductwork.

Figure 5:
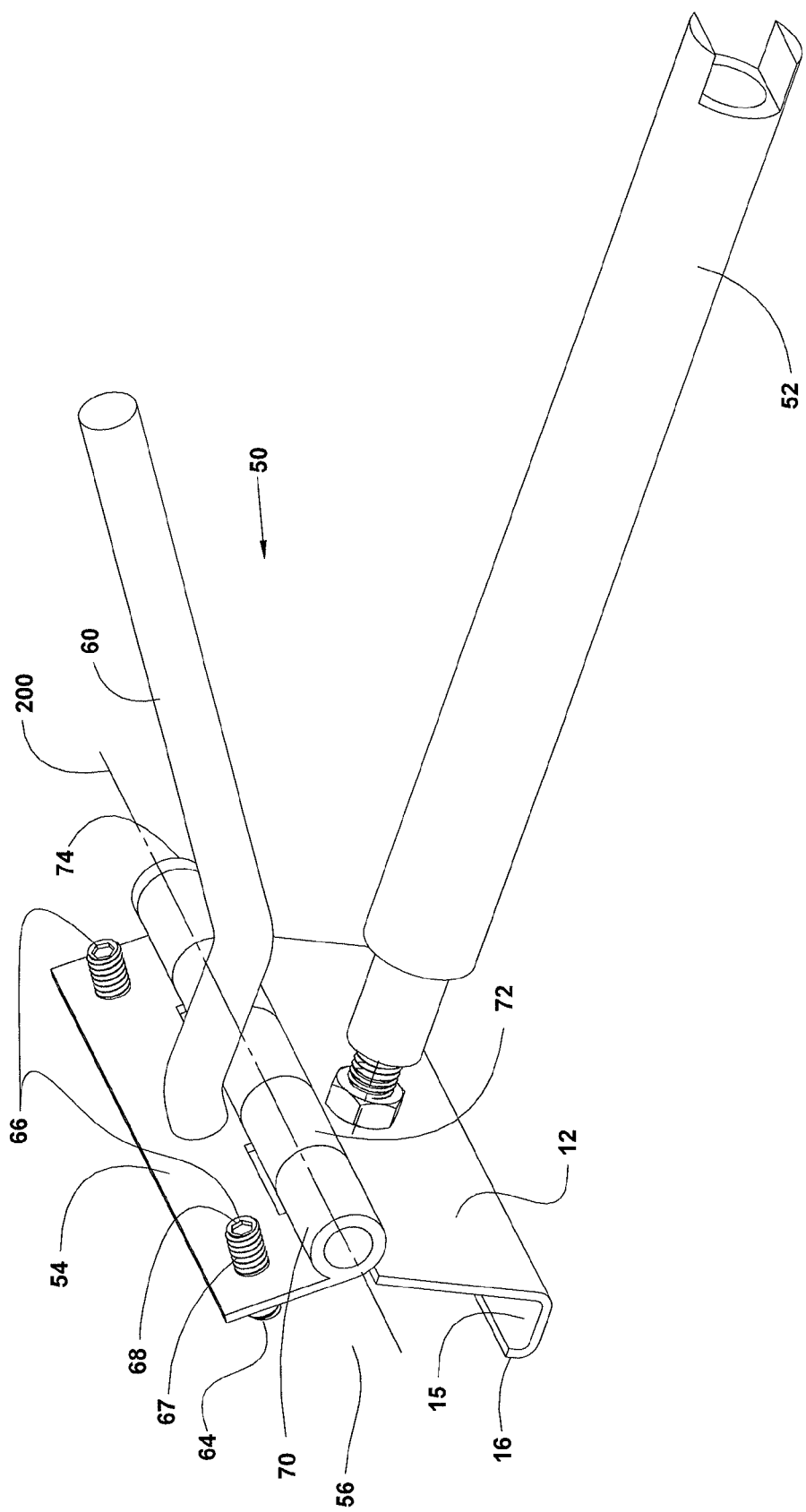
FIG. 5 shows another embodiment of a tool for installing and crimping a cleat having an installing plate for holding an installing a cleat, and a hinged crimping plate for crimping the installed cleat.
Figure 6A:
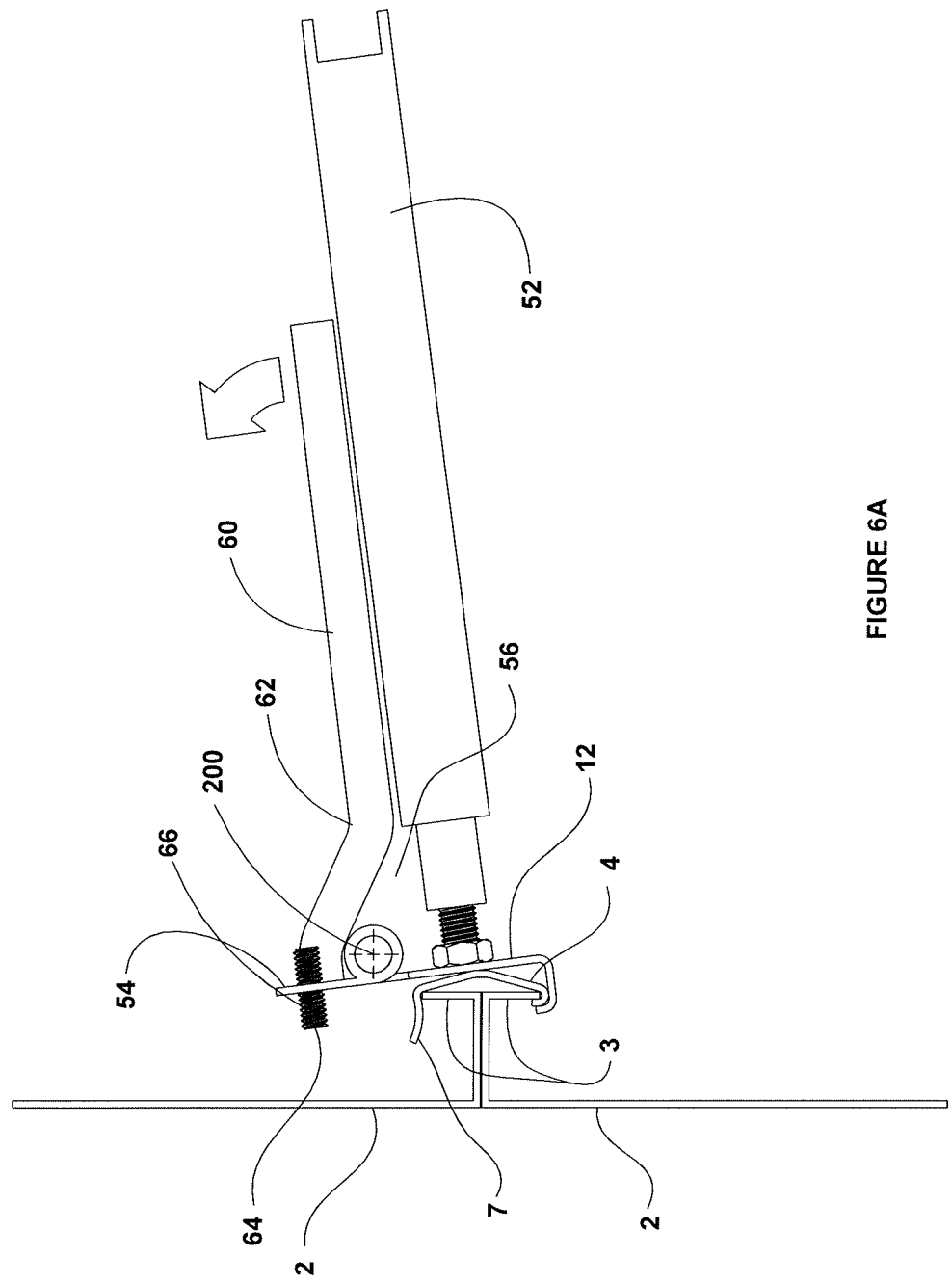
FIG. 6A shows the tool of FIG. 5 in use, installing a cleat on the flanges of ductwork sections.
Figure 6B:
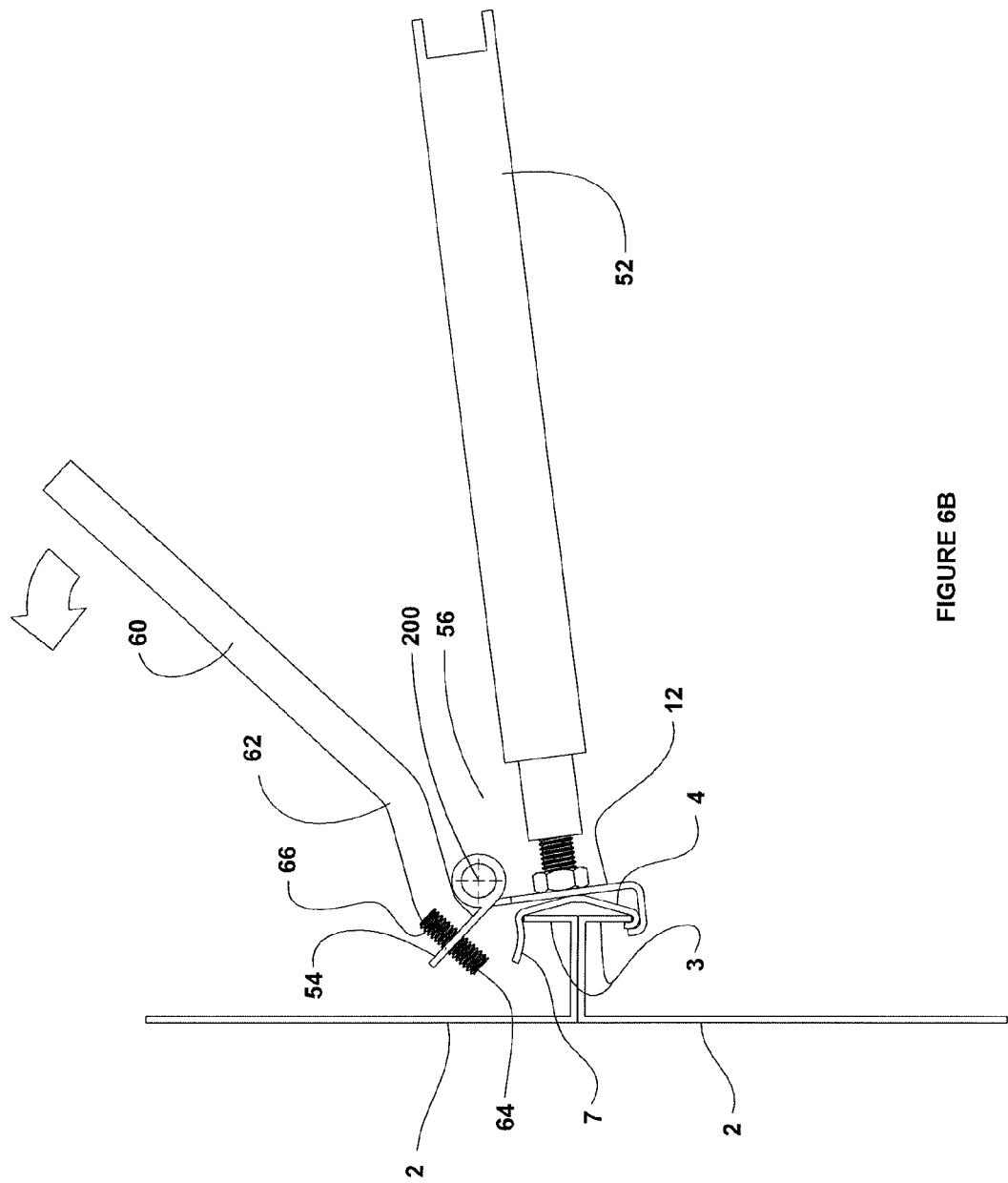
FIG. 6B shows the tool of FIG. 6A in use, pivoting the crimping plate toward the installed cleat.

FIGS. 5-7 show a third embodiment of combination tool 50 for installing a cleat and crimping a cleat for fastening together sections of sheet ductwork. The combination tool 50 includes elongated installing plate 12 having a front face 13, a ledge 15 extending from the bottom of the front face 13 with an upturned lip 16, and a handle 52 attached to the rear face 14 of installing plate 12. The handle 52 and installing plate 12 of the combination tool 50 can be used to hold and install the cleat onto the out-turned flanges of the ductwork, as described above and shown in FIG. 6A. The combination tool 50 also includes a crimping plate 54 that is attached to the top of the installing plate 12 for pivoting at a hinge 56. The crimping plate 54 has a crimping surface 64, typically disposed out and away from the pivot axis 200 of the hinge 56, so that pivoting of the crimping plate 54 causes the crimping surface 64 to engage an opposite leg 7 of the cleat 4, as shown in FIGS. 6B and 7, and with the application of force (F) by the user, to crimp securely the second leg 7 of the cleat 4 around the flange 3 of adjourning sections 2 of the ductwork.

To facilitate applying the force, a crimping handle 60 extends rearwardly from the crimping plate 54, with an attachment end positioned out and away from the pivot axis 200 of the hinge to improve mechanical advantage. The crimping handle 60 preferably lies proximate the main handle 52 during the first step of installing the cleat, so that both handles can be controlled with one hand. A swale or bend 62 in the handle 60 can be provided for this purpose. The combination device can also optionally include a means for securing the crimping handle 60 in proximity with the main handle 52, such as a mechanical securement, for example a clasp on the main handle that retains the crimping handle, or a magnetic securement, such as cooperating magnetic and ferric elements provided in the main handle and crimping handle.

For a typically cheat of approximately 6 inches, it is generally known that forming two crimps in the cleat, one at each end, is sufficient to squeeze together and secure the confronting flanges 3 of the adjacent ductwork sections 2. The illustrated crimping plate 54 includes a pair of crimping surfaces 64, defined at the ends of two threaded, cylindrical members 66 (set screws) extending from both ends of the front face of the crimping plate 54. The threaded members 66 are threadable through spaced-apart threaded bores 68 positioned at opposed sides of the crimping plate 54 for axial threaded movement through the crimping plate 54, for adjusting the extending distance of the distal end surface 64 from the front face of the crimping plate 54, and from the axis 200. A drive recess 68 can be formed in the rear end of the threaded member 66 for driving the member 66 with a hand tool, such as an Allen wrench or screw driver.

The hinge 56 can be one of any well known types of hinges. The top of the installing plate 12 can define a first member of the hinge, shown as two or more spaced apart tubes 70, and the bottom of the crimping plate 54 can define a second member of the hinge, shown as at least one intermediate tube 72, with a removable pin 74 than passes through the respective tubes 70 and 72 of the hinge with frictional clearance. The hinge 56 can be disassembled into the respective installing and crimping plates by withdrawing the removable pin 74.

It can be understood that the third embodiment can alternatively be provide with a removable handle 12, as described in the first embodiments, and a handle with a nut driver at the distal end, as described in the second embodiment.

Figure 8:
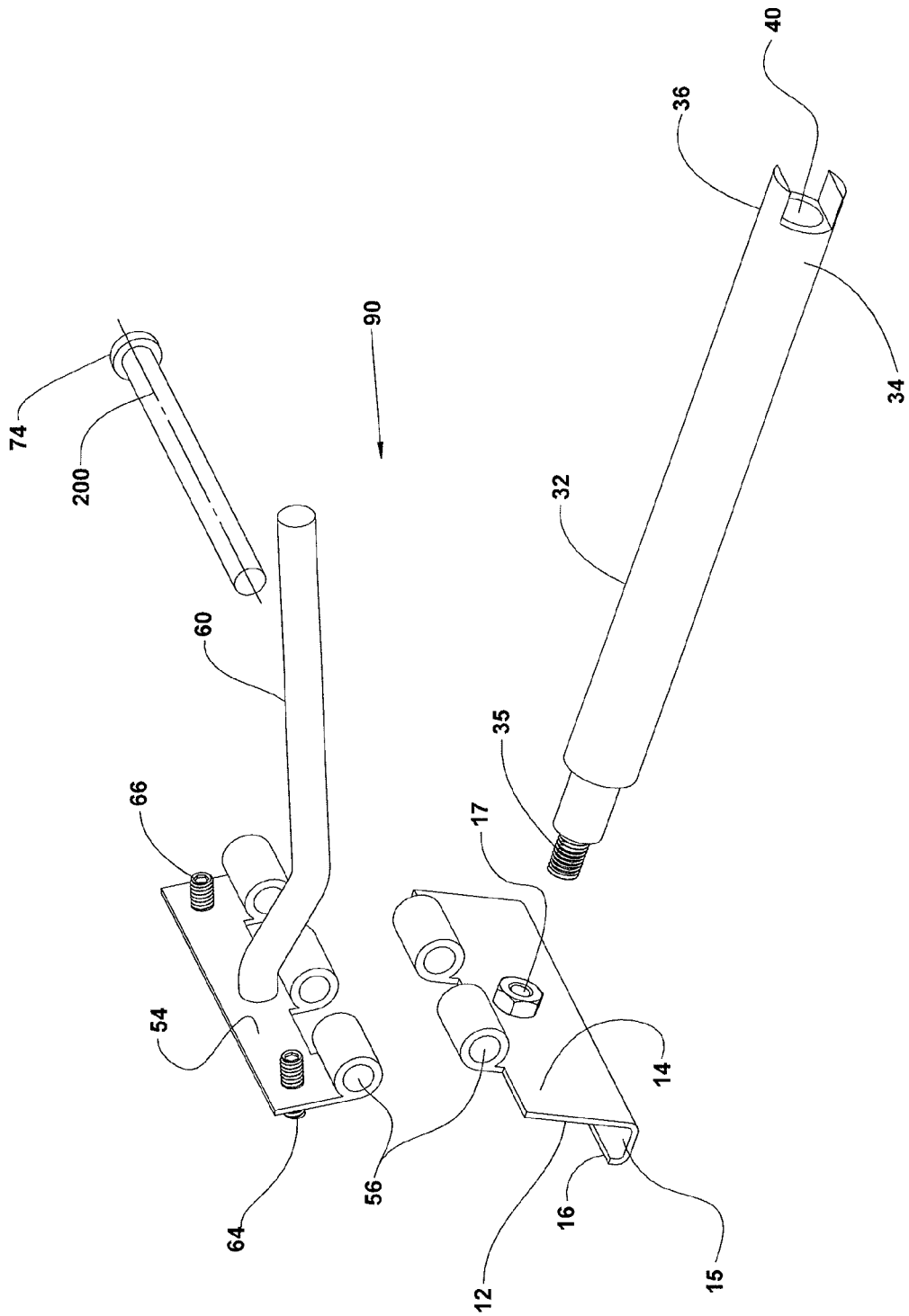
FIG. 8 shows an exploded view of the tool of FIG. 5.

FIG. 8 shows a fourth embodiment of a combination tool 90 for installing a cleat and crimping for fastening together sections of sheet ductwork, and for adjusting threaded nuts for raising and lowering strut channel elevation for leveling the ductwork.

This embodiment incorporates elements and features of the preceding three embodiments, and is illustrated in exploded.

The combination tool 90 includes an installing plate 12 having a front face and a rear face 14, and including a ledge 15 extending forward from the bottom edge of the front face of the installing plate, with an upturned lip 16 at its distal end, and a threaded bore 17 on the rear face. Details of various features of the installing plate 12 are described in the first embodiment.

The combination tool 90 includes a tubular handle 32 attached to the rear face 14 of the installing plate 12 at its threaded proximal end 35. The tubular handle has a hollow tubular body 34, the hollow portion extending from its distal end 36 to at least near the proximal end 35. The tubular handling also includes a nut driver 40 at its distal end for engaging and driving a threaded nut onto a threaded rod. Details of various features of the installing plate 12 are described in the second embodiment.

The combination tool 90 also includes a crimping plate 54 that is attached to the top of the installing plate 12 for pivoting at a hinge 56, and a crimping handle 60 that extends rearwardly from the crimping plate 54 for applying pivoting force, with an attachment end positioned out and away from the pivot axis 200 of the hinge 56 to improve mechanical advantage. The crimping plate 54 has a surface, shown as the ends of two threaded, cylindrical members 66, which are disposed out and away from the pivot axis 200 of the hinge 56 (removable pin 74), so that pivoting of the crimping plate 54 causes the surface to engage and crimp the opposite leg 7 of the cleat 4 (FIG. 7). Details of various features of the crimping plate and hinge are described in the third embodiment.

We claim:

1. A tool for installing and crimping a cleat for fastening together sections of sheet ductwork, the tool comprising:
   a) an installing plate having a top edge, a bottom edge, a front face and a rear face, including a ledge extending from the bottom of the front face, the distal edge of the ledge including an upturned lip, configured to hold a cleat prior to installation, and including a threaded bore on the rear face between the top edge and the bottom edge; and
   b) at least two handles, each having a threaded proximal end for selected threaded connection into the threaded bore of the installing plate, the first handle having a length of at least 1.5 times the length of the installing plate, and the second handle having a length of about one-half the length of the first handle.

2. A combination tool for installing a cleat for fastening together sections of sheet ductwork, and for adjusting threaded nuts, the combination tool comprising:
   a) an elongated installing plate having a front face, including a ledge extending from the bottom of the front face, the distal edge of the ledge including an upturned lip, configured to hold a cleat prior to installation; and
   b) a handle attached to the rear face of the installing plate, having a hollow tubular body, the distal end of the hollow tubular bore comprises a nut driver for engaging and driving a threaded nut.

3. The tool according to claim 2 wherein the nut driver includes the distal end of the tubular body having a rectangular bore transverse the axis of the hollow tubular body to define confronting parallel flats to engaging oppose sides of a threaded nut.

4. The tool according to claim 2 wherein a rear face of the installing plate has a threaded bore, and the handle includes a threaded proximal end that threads into the threaded bore of the installing plate for separable attachment of the handle to the installing plate.

5. The tool according to claim 4 wherein the proximal end of the handle further includes a shank, disposed inboard of the threaded end, configured engagement by the chuck of a power drill.

6. A combination tool for installing and crimping a cleat for fastening together sections of sheet ductwork, the combination tool comprising:
   a) an elongated installing plate having a front face, including a ledge extending from the bottom of the front face, the distal edge of the ledge including an upturned lip, configured to hold a cleat prior to installation;
   b) a handle attached to and extending from the rear face of the installing plate;
   c) a crimping plate pivotably attached to the top of the installing plate, the crimping plate having a surface for engaging and crimping a leg of the cleat; and
   d) a crimping handle attached to and extending rearwardly from the crimping plate.

7. The combination tool according to claim 6 wherein a rear face of the installing plate has a threaded bore, and the handle includes a threaded proximal end that threads into the threaded bore of the installing plate for separable attachment of the handle to the installing plate.

8. The combination tool according to claim 6 wherein the top of the installing plate and a bottom of the crimping plate define members of a hinge, the hinge further including a removable pin for forming the hinge, and for disassembling the installing plate from the crimping plate when removed.

9. The combination tool according to claim 6, wherein the elongated installing plate further has a top edge, a bottom edge, and a rear face, and the ledge extends from the bottom edge of the front face, and the handle extends from the rear face between the top edge and the bottom edge of the installing plate.

10. The combination tool according to claim 9 wherein the engaging surface includes at least two contact surfaces extending from the front face of the crimping plate.

11. The combination tool according to claim 10 wherein the at least two contact surfaces comprise the distal end of at least two threaded, cylindrical members, each threaded member being disposed in spaced-apart threaded bores in the crimping plate for axial threaded movement for adjusting the extending distance of the distal end from the front fact of the crimping plate.

* * * * *